Patented July 11, 1944

2,353,593

UNITED STATES PATENT OFFICE 2,353,593

THIAZOLES AND THIAZOLINES

Winfield Scott, Akron, Ohio, assignor to Wingfoot Corporation, Wilmington, Del., a corporation of Delaware No Drawing. Application March 6, 1942, Serial No. 433,632

5 Claims. (Cl. 260—302)

This invention relates to new chemical compounds having the general formula

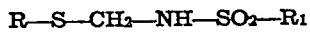

$$R-S-CH_2-NH-SO_2-R_1$$

where R is a thiazyl or thiazolyl radical derived respectively from a thiazole or a thiazoline and $R_1$ is an aryl group. The thiazole group of the above formula may be that of an arylene thiazyl such as only one of the following: 2-benzothiazyl, 6-chlor-2-benzothiazyl, 4-phenyl-2-benzothiazyl, 4-methyl-2-benzothiazyl, 6-ethoxy-2-benzothiazyl, 6-methoxy-2-benzothiazyl, 6-chlor-5-nitro-2-benzothiazyl, 6-hydroxy-2-benzothiazyl, 5-nitro-2-benzothiazyl, 5-chlor-2-benzothiazyl, tetrahydro-2-benzothiazyl, the alpha and beta naphthothiazyls, both substituted and unsubstituted, and other alkyl, aryl, nitro, amino, hydroxy, halo, alkoxy, etc. derivatives of the arylene thiazyl group. The thiazyl group may also be 2-thiazyl or a substituted thiazyl group, such as 4-methyl-2-thiazyl, 4-5-dimethyl-2-thiazyl, 5-methyl-2-thiazyl, 5-phenyl-2-thiazyl, 5-benzyl-2-thiazyl, 4-methoxy-5-methyl thiazyl, 5-(4-chlorphenyl)-2-thiazyl or 4-chlor-2-thiazyl and other thiazyls substituted in the 4-, or 5-, or 4- and 5-positions with an alkyl, alkoxy, thialkyl, aryl, aralkyl, chloro or nitro, etc. group. The mercaptothiazolyl may be 2-thiazolyl, 4-methyl-2-thiazolyl, 4-ethyl-2-thiazolyl, 4-benzyl-2-thiazoyl and 5-chloro-2-thiazolyl, or other groups in which the 4- or 5-position or both may be substituted with a usual substituent.

The $R_1$ of the formula is a part of the sulfonamide group. In spite of the fact that it is usual to refer to such compounds as benzene sulfonamide, toluene sulfonamide, etc. $R_1$ is referred to herein as a radical. It may be phenyl, tolyl, alpha naphthyl, beta naphthyl, xenyl, etc. and may form groups such as benzene-4-chlorosulfonylamido, toluene-2-hydroxy-4-sulfonylamido, naphthalene disulfonylamido, xylene sulfonylamido mixture or a mixture of any one or more of the sulfonylamido compounds.

The compounds of this invention accelerate the vulcanization of rubber and may have other uses.

The compounds of this invention may be prepared in any one of several ways. For example, they may be made by mixing the mercaptothiazole or mercaptothiazoline, formaldehyde and the sulfonamide and subjecting them to reacting conditions. They may be made by reacting the mercaptothiazole or mercaptothiazoline with a methylol sulfonamide. A third method of forming them comprises reacting the sulfonamide with a 2-methylolmercaptothiazole or mercaptothiazoline.

Examples of preparing the compound follow:

Example 1

The new compound may be prepared in a solvent such as alcohol, as follows: Sixteen and seven-tenths grams (0.1 mol) of 2-mercaptobenzothiazole, 17.1 grams (0.1 mol) of p-toluene sulfonamide and 8.5 grams (slightly in excess of 0.1 mol) of 37% formaldehyde were added to 300 cc. of alcohol and warmed for a few minutes. To the solution was then added 25 ml. of concentrated hydrochloric acid. The mixture was then refluxed for two hours, then allowed to stand at room temperature. Soon yellow leaflets began to separate. After filtering, washing and drying these crystals they were found to melt at 161–162° C.

Example 2

The material of Example 1 can also be made without the use of an acid catalyst. Thirty three and four-tenths grams of 2-mercaptobenzothiazole, 34.2 grams of p-toluene sulfonamide and 6.0 grams of paraformaldehyde were added to 300 cc. of benzene in a flask equipped with a stirrer, thermometer and reflux containing a water trap in the condensate return. When no more water was formed, the refluxing was stopped, and flask and contents allowed to cool. Yellow leaflets melting at 161–162° C. separated out in a yield of 86%. The analysis for nitrogen, calculated at 8.00%; found, 7.67%. This indicates the reaction of equal mols of the three reactants and the formula is presumed to be that given above.

Example 3

Substituting 2-mercapto-6-ethoxy benzothiazole for 2-mercaptobenzothiazole in the procedure of Example 2, the reaction proceeds smoothly to give the corresponding derivative. In this experiment, one-tenth molar quantities were used in a solution of 100 cc. of toluene. The theoretical amount of water of condensation was obtained and the crystalline reaction product after recrystallizing from toluene, melted at 157° C.

Example 4

Alkyl or unsubstituted mercaptothiazoles undergo the reaction with formaldehyde and a sulfonamide as readily as arylene mercaptothiazoles. Thirteen and one-tenth grams of 4-methyl-2-mercaptothiazole, 17.1 grams of p-toluene sulfonamide and 3.0 grams of paraformaldehyde were heated to the refluxing temperature of toluene in 100 cc. of this solvent. The reaction proceeds smoothly and the crystalline reaction product melted at 134° C. after recrystallization from toluene at 135° C.

*Example 5*

Twenty three and eight-tenths grams (0.2 mol) of 2-mercapthiazoline and 34.2 grams (0.2 mol) of p-toluene sulfonylamide are added to 250 cc. of benzene in a suitable reaction vessel equipped with a stirrer and a reflux with a water trap in the return. The suspenison is heated to refluxing of the solvent when five drops of concentrated hydrochloric acid is added. Six grams of paraformaldehyde is added in portions and refluxing is continued until no more water is obtained in the trap. In this case, 3.4 cc. of water was recovered. The reaction product crystallizes out on cooling and is obtained as white crystals. After crystallization from benzene, the product was found to melt at 126–128° C.

I claim:

1. As a new composition of matter, a compound selected from the group consisting of the 2 - (arylsulfonylamide - methylene - thio) - thiazoles and the 2-(arylsulfonylamide-methylene-thio)-thiazolines.

2. As new compounds, the 2-(arylsulfonylamido-methylene-thio)-thiazoles.

3. As new compounds, the 2-(arylsulfonylamido-methylene-thio)-thiazolines.

4. As new compounds, the 2-(arylsulfonylamido-methylene-thio)-arylenethiazoles.

5. As new compounds, the 2-(arylsulfonylamido-methylene-thio)-benzothiazoles.

WINFIELD SCOTT.

CERTIFICATE OF CORRECTION.

Patent No. 2,353,593.   July 11, 1944.

WINFIELD SCOTT.

It is hereby certified that error appears in the printed specification of the above numbered patent requiring correction as follows: Page 1, first column, line 5, for "thiazolyl" read --dihydrothiazyl--; line 7, for "thiazole" read --thiazyl--; line 8, strike out "that of an"; lines 27 to 30 inclusive, strike out "The mercaptothiazolyl may be 2-thiazole, 4-methyl-2-thiazolyl, 4-ethyl-2-thiazolyl 4-benzyl-2-thiazoyl and 5-chloro-2-thiazolyl" and insert instead --The dihydrothiazyl group in the formula may be 2-dihydrothiazyl, 4-methyl-2-dihydrothiazyl, 4-ethyl-2-dihydrothiazyl, 4-benzyl-2-dihydrothiazyl, and 5-chloro-2-dihydrothiazyl--; page 2, first column, line 4, before "after" insert --and--; and that the said Letters Patent should be read with this correction therein that the same may conform to the record of the case in the Patent Office.

Signed and sealed this 3rd day of October, A. D. 1944.

(Seal)

Leslie Frazer
Acting Commissioner of Patents.